(12) United States Patent
Salazar Loera et al.

(10) Patent No.: US 10,160,374 B2
(45) Date of Patent: Dec. 25, 2018

(54) CARGO MANAGEMENT SYSTEM

(71) Applicant: GM GLOBAL TECHNOLOGY OPERATIONS LLC, Detroit, MI (US)

(72) Inventors: Jose Jonathan Salazar Loera, Aguascalientes (MX); Miguel Borbolla Resenos, Toluca (MX); Rodolfo De La Mora Ramirez, Toluca (MX)

(73) Assignee: GM Global Technology Operations LLC, Detroit, MI (US)

( * ) Notice: Subject to any disclaimer, the term of this patent is extended or adjusted under 35 U.S.C. 154(b) by 230 days.

(21) Appl. No.: 15/367,691

(22) Filed: Dec. 2, 2016

(65) Prior Publication Data

US 2018/0154835 A1   Jun. 7, 2018

(51) Int. Cl.
  *B60P 7/08*  (2006.01)
  *B60P 7/14*  (2006.01)
  *B60R 5/04*  (2006.01)
  *B60P 7/06*  (2006.01)

(52) U.S. Cl.
  CPC ........ *B60P 7/14* (2013.01); *B60P 7/06* (2013.01); *B60P 7/0892* (2013.01); *B60R 5/04* (2013.01)

(58) Field of Classification Search
  CPC .. B60P 7/14; B60P 7/06; B60P 7/0892; B60R 5/04

USPC ..... 410/94, 95, 89, 121, 130, 140, 141, 150, 410/153, 129; 224/403, 404, 510, 531, 224/42.33, 42.34, 42.35, 42.36, 549, 554, 224/925; 296/24.4, 37.5, 37.6; 248/149, 248/150, 351, 354.1, 354.6

See application file for complete search history.

(56) References Cited

U.S. PATENT DOCUMENTS 8,057,141 B2 * 11/2011 Bernhardsson ......... B60R 11/00
                                                    410/120
8,858,137 B2 * 10/2014 Aro ....................... B60P 7/0892
                                                    410/120

* cited by examiner

*Primary Examiner* — Stephen T Gordon
(74) *Attorney, Agent, or Firm* — Quinn IP Law

(57) ABSTRACT

A cargo management system for a cargo area at least partially defined between opposing sidewalls and a load floor of a vehicle includes at least one guide surface disposed proximate the load floor and a support structure adjustably connected to the at least one guide surface. The support structure includes a first post and a second post adjustable relative to the first post. A first translating member includes an upper portion pivotally connected to an upper end of the first post and a lower portion movably connected to a lower end of the second post. A second translating member includes an upper portion pivotally connected to an upper end of the second post and a lower portion movably connected to a lower end of the first post. The first and second translating members are adjustable between a first position and at least one second position.

20 Claims, 2 Drawing Sheets

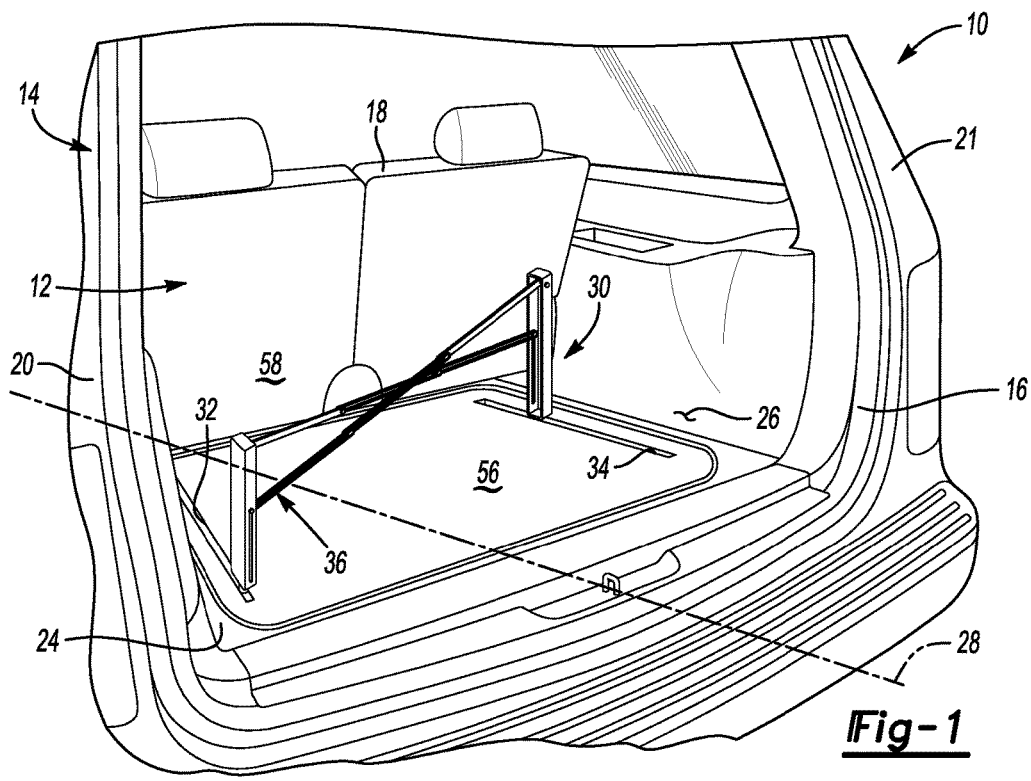
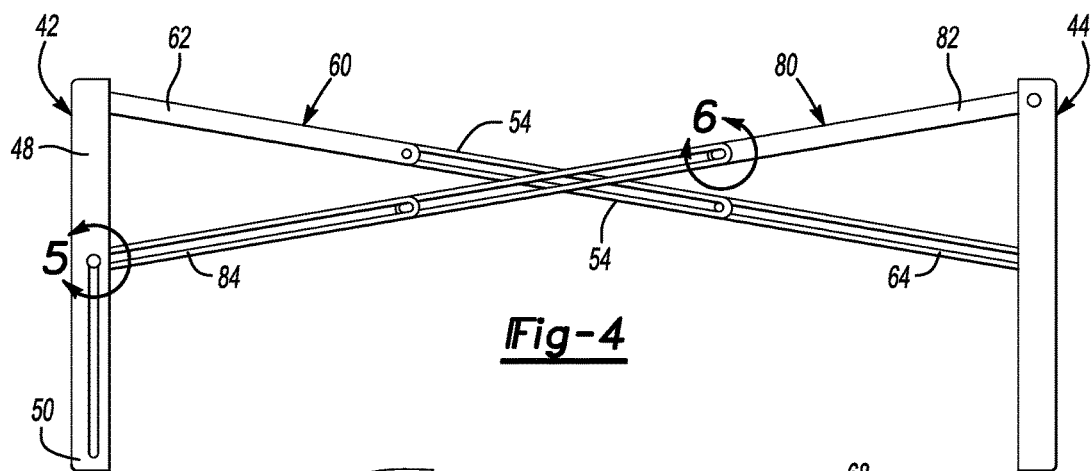
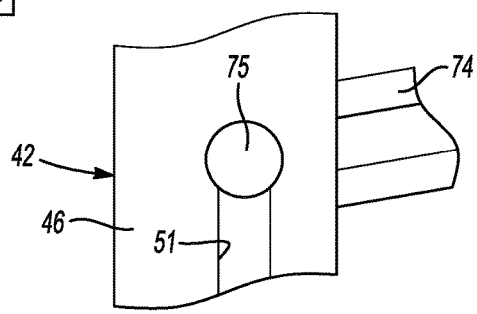
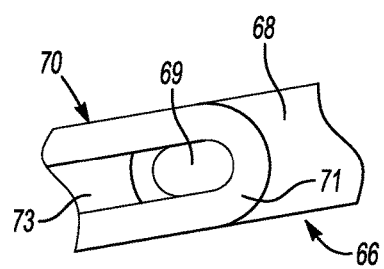

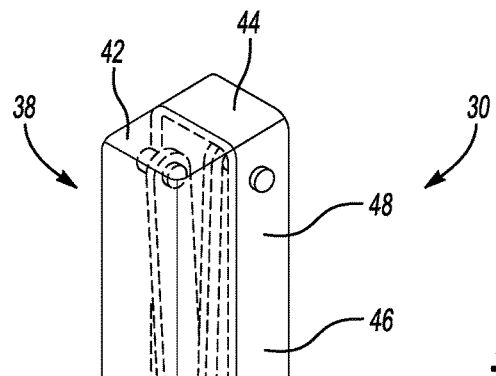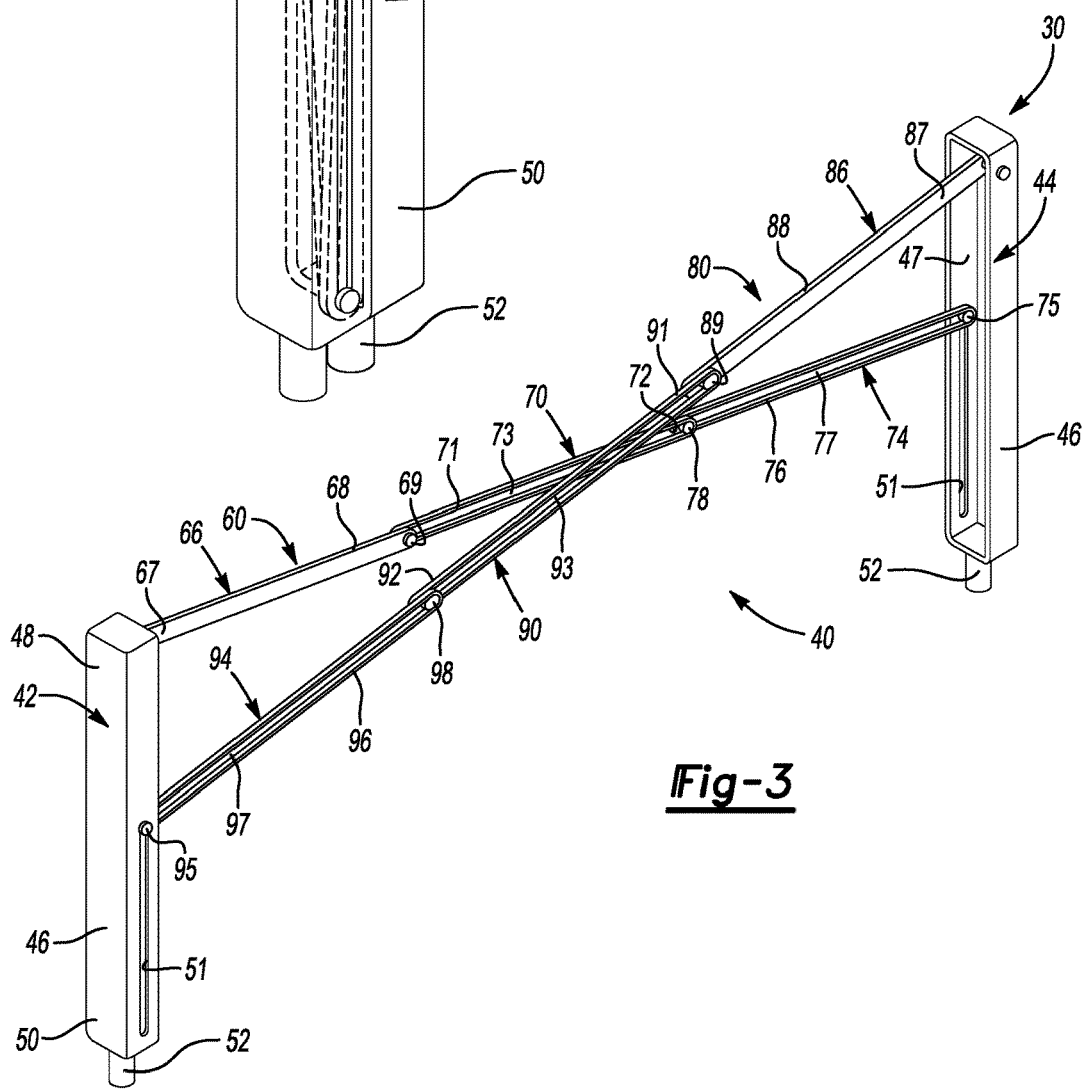

CARGO MANAGEMENT SYSTEM

INTRODUCTION

The present disclosure relates to a storage area for a vehicle, and more particularly, to a cargo management system for a storage area of a vehicle.

Vehicles may include a load floor that is configured to support cargo in a cargo area. For example, minivans and sport-utility vehicles typically include a cargo area in the rear of the vehicle. Access to the cargo area is provided by a rear body opening that is selectively closed by a rear closure panel, such as a tailgate or a lift gate. Similarly, pickup trucks include a cargo area, i.e., a cargo box, with access to the cargo box being provided by an opening at the rear of the truck and that is selectively closed by a tailgate. The load floor forms the lower surface of the cargo area or cargo box.

SUMMARY

A cargo management system for a cargo area at least partially defined between opposing sidewalls and a load floor of a vehicle includes at least one guide surface disposed proximate the load floor and a support structure adjustably connected to the at least one guide surface. The support structure includes a first post and a second post adjustable relative to the first post. Each of the first and second posts includes a housing having an upper end and an opposing lower end. A first translating member is operatively connected to and extends between the first and second posts. The first translating member includes an upper portion pivotally connected to the upper end of the first post and a lower portion movably connected to the lower end of the second post.

A second translating member is operatively connected to and extends between the first and second posts. The second translating member includes an upper portion pivotally connected to the upper end of the second post and a lower portion movably connected to the lower end of the first post. The first and second translating members are adjustable between a first position wherein the first post is proximate the second post and at least one second position wherein the first and second translating members are adjusted to position the second post relative to the first post.

The at least one guide surface of the cargo managements system includes a first guide rail and an opposing second guide rail disposed in the load floor of the vehicle configured to receive the first and second posts of the support structure. One or more projections extend from the lower end of the housing of each of the first and second posts. The one or more projections of the first post are configured to releasably engage the first guide rails and the one or more projections of the second post are configured to releasably engage the second guide rail.

The housing of each of the first and second posts further includes a recess formed by the housing and extending at least partially therethrough that is configured to receive a portion of the first and second translating members when the first and second translating members are placed in the first position. The housing of each of the first and second posts includes a passage formed in the lower end of the housing configured to receive a portion of the lower end of the first and second translating members. The passage of the first and second posts extend generally vertically between the upper end and lower end of the first and second posts to receive and guide the lower portions of the first and second translating members.

The first and second translating members may further include an upper member having a first end pivotally connected to the upper end of the housing and an opposing second end and a lower member having a first end connected to and adjustable through the passage in the lower end, an opposing second end and a channel formed in the lower member extending at least partially between the first end and the opposing second end. A central member having a first end, a second end cooperating with the channel in the lower member and a channel formed in the central member extends at least partially between the first end and opposing second end. The second end of the upper member is adjusted through the channel in the central member and the second end of the central member is adjusted through the channel in lower member as the second post is moved between the first position and the at least one second position.

In another embodiment of the disclosure, a support structure includes a first post and a second post adjustable relative to the first post. Each of the first and second posts includes a housing having an upper end and an opposing lower end. A first translating member is operatively connected to and extends between the first and second posts. The first translating member includes an upper portion pivotally connected to the upper end of the first post and a lower portion movably connected to the lower end of the second post.

A second translating member is operatively connected to and extends between the first and second posts. The second translating member includes an upper portion pivotally connected to the upper end of the second post and a lower portion movably connected to the lower end of the first post. The first and second translating members are adjustable between a first position wherein the first post is proximate the second post and at least one second position wherein the first and second translating members are adjusted to position the second post relative to the first post.

The first and second translating members may further include an upper member having a first end pivotally connected to the upper end of the housing and an opposing second end and a lower member having a first end connected to and adjustable through the passage in the lower end, an opposing second end and a channel formed in the lower member extending at least partially between the first end and the opposing second end. A central member having a first end, a second end cooperating with the channel in the lower member and a channel formed in the central member extends at least partially between the first end and opposing second end. The second end of the upper member is adjusted through the channel in the central member and the second end of the central member is adjusted through the channel in the lower member as the second post is moved between the first position and the at least one second position.

In yet another embodiment, a vehicle includes a cargo area at least partially defined between opposing sidewalls and a load floor and cooperates with a cargo management system. The cargo management system includes at least one guide surface disposed proximate the load floor and a support structure adjustably connected to the at least one guide surface. The support structure includes a first post and a second post adjustable relative to the first post. Each of the first and second posts include a housing having an upper end and an opposing lower end. A first translating member is operatively connected to and extends between the first and second posts. The first translating member includes an upper portion pivotally connected to the upper end of the first post and a lower portion movably connected to the lower end of the second post.

A second translating member is operatively connected to and extends between the first and second posts. The second translating member includes an upper portion pivotally connected to the upper end of the second post and a lower portion movably connected to the lower end of the first post. The first and second translating members are adjustable between a first position wherein the first post is proximate the second post and at least one second position wherein the first and second translating members are adjusted to position the second post relative to the first post.

The above noted and other features and advantages of the present disclosure are readily apparent from the following detailed description when taken in connection with the accompanying drawings.

BRIEF DESCRIPTION OF THE DRAWINGS

FIG. 1 is a perspective view of a rear end of a vehicle having a cargo management system disposed in an interior cargo area of the vehicle;

FIG. 2 is a perspective view of a support structure of a cargo management system in a first or stored position in accordance with the disclosure;

FIG. 3 is a perspective view of the support structure of the cargo management system in at least one second or deployed position;

FIG. 4 is a front plan view of the support structure of the cargo management system in the at least one second or deployed position;

FIG. 5 is a front plan view of the lower end of the second translating member movably connected in a passage in the housing of the first support post along section 5 of FIG. 4; and FIG. 6 is a front plan view of the interconnected upper and central members of the first translating member of the support structure of the gate along section 6 of FIG. 4 in accordance with the disclosure.

DETAILED DESCRIPTION

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure.

Referring to the drawings, wherein like reference numbers correspond to like or similar components throughout the several Figures, FIG. 1 shows a schematic view of a motor vehicle 10. Vehicle 10 is shown for illustrative purposes and demonstrates only one possible environment into which a storage compartment or area 12 may be defined. It is understood that the vehicle may be a mobile platform, such as an airplane, all-terrain vehicle (ATV), boat, personal movement device, robot and the like to accomplish the purposes of this disclosure.

A body 14 of the vehicle 10 includes a rear door opening 16. A vehicle seat 18 is disposed within an interior of the vehicle 10 and is at least accessible through the rear door opening 16. The seats 18 may be second or third row of seats in a sport utility vehicle or the like. Alternatively, the seats 18 may be the front seats in a vehicle 10 having only one row of seats, such as a pickup. Opposing lateral sidewalls 20 of the vehicle body 14 include an interior portion extending between a roof (not shown) of the vehicle body 14 and a load floor 24. An interior cargo area 26 is at least partially defined between opposing sidewalls 20 and a load floor 24. The cargo area 26 extends behind the seats 18, between the opposing sidewalls 20, and above the load floor 24. A rear closure panel or door (not shown) cooperates with the rear door opening 16 to further define the cargo area 26.

It is understood that use of direction terms relative to the vehicle orientation may be used throughout the description regarding location of the components within the vehicle 10. Thus, the forward direction would be toward an engine compartment for the vehicle 10 and opposite the rear end of the vehicle 10. The load floor 24 may include a floor covering or upholstery, such as carpet or the like, to match with the interior of the vehicle 10. Load floor 24 may be generally horizontal to and parallel with the rear door opening 16 and may provide a contiguous surface to receive and support objects thereon.

Referring additionally to FIGS. 2-4, a cargo management system 30 may be disposed in the interior cargo area 26 of the vehicle 10. The cargo management system 30 includes at least one guide surface 32 disposed proximate to and cooperating with the load floor 24. It is contemplated that the at least one guide surface 32 may include at least one rail provided on or incorporated in the load floor 24 that extends generally through the interior cargo area 26 between the opposing sidewalls 20 of the vehicle 10. The at least one rail 32 may extend generally perpendicular to a longitudinal axis 28 of the vehicle 10 as shown in FIG. 1, though it is understood that the at least one rail may also extend generally laterally or other direction through the cargo area 26.

In one embodiment of the disclosure, the at least one guide surface 32 includes a first guide rail 32 cooperating with the load floor 24 disposed proximate a first sidewall 20 and an opposing second guide rail 34 cooperating with the load floor 24 disposed proximate a second sidewall 21. First and second guide rails 32, 34 may be integrally formed in the load floor 24 or may be welded, bolted, fastened, or otherwise secured to the load floor 24 such that rails 32, 34 are integrated into the vehicle 10 to serve as both a guide for positioning and supporting the cargo management system 30.

A support structure or gate 36 may be releasably connected to the one or more of the rails 32, 34 above the load floor 24. The gate 36 may be adjustably positioned between a first position 38 as is shown in FIG. 2 wherein the gate 36 is in a retracted or stored position and at least one second position 40 as is shown in FIGS. 3 and 4 wherein the gate 36 is placed in an extended or deployed position. It is contemplated that the gate 36 may be disengaged with the first guide rail 32 for storage in or removal from the vehicle 10 when the gate 36 is placed in the first position 38 as will be described in greater detail below.

The gate 36 includes at least one support post 42 releasably secured and movable relative to the load floor 24. In one embodiment, the gate 36 includes a first post 42 and a second post 44 adjustable relative to the first post 42. Each of the first post 42 and second post 44 include a post housing 46 having an upper end 48 and an opposing lower end 50. The lower end 50 of posts 42, 44 may be a terminal end of the housing 46 and configured to receive one or more projections 52. The one or more projections 52 may be configured to releasably engage a portion of rails 32, 34. Alternatively, the one or more projections 52 may be configured to position the first and second support posts 42, 44 on a non-vehicle surface (not shown).

In one non-limiting example, the one or more projections 52 may be T-shaped to cooperate with a corresponding T-shaped slot in the guide rails 32, 34 to receive the projection 52 of the support posts 42, 44. In this arrangement, the projections 52 on each support post 42, 44 are translated in the slots of the guide rails 32, 34 to a desired position along the rails 32, 34. It is also contemplated that the support posts 42, 44 may be removed from the slots in the guide rails 32, 34 by moving the posts 42, 44 past the ends of the rails 32, 34 when the gate 36 is not in use to reduce vehicle weight and improve fuel economy.

As will be described in greater detail below, a plurality of translating members 54 of the gate 36 are operatively connected to and extend between the first and second support posts 42, 44. In one embodiment of the disclosure, a net, screen or panel could extend between the posts 42, 44 and cooperate with the plurality of members 54. The gate 36 divides the interior cargo area 26 between a forward cargo area 56 and a rearward cargo area 58 in the at least one second position shown in FIG. 1 to allow a user to organize the cargo area 26 and retain items of various sizes based upon adjustment of the posts 42, 44 of the gate between a variety of positions. It is also understood that the cargo management system may be utilized with a single translating member.

The gate 36 may extend substantially perpendicular to the opposing sidewalls 20, 21 and to the load floor 24 when the gate 36 is in the at least one second position. The gate 36 is not limited to an embodiment that is perpendicular to the sidewalls 20, 21 and the load floor 24. For example, the interior cargo area 26 may be divided laterally or other direction depending on the placement of the first and second rails 32, 34 to customize the interior cargo area 26 into different cargo area portions to best separate, support, and retain different cargo loads.

Referring now to FIGS. 3 and 4, the plurality of translating members 54 of the cargo management system include a first translating member 60 and a second translating member 80. The first translating member 60 is operatively connected to and extends between the first post 42 and the second post 44. The first translating member 60 includes an upper portion 62 pivotally connected to the upper end 48 of the first post 42 and a lower portion 64 movably connected to the lower end 50 of the second post 44.

A second translating member 80 is disposed proximate to the first translating member 60 and is operatively connected to and extends between the first post 42 and the second post 44. The second translating member 80 includes an upper portion 82 pivotally connected to the upper end 48 of the second post 44 and a lower portion 84 movably connected to the lower end 50 of the first post 42. The first and second translating members 60, 80 are adjustable between a first position as shown in FIG. 2 wherein the first post 42 is disposed proximate the second post 44 to retract the gate 36 and at least one second position as shown in FIG. 3 wherein the first and second translating members 60, 80 are adjusted to move the second post 44 away from the first post 42 to extend the gate 36.

As is best shown in FIG. 3, the housing 46 of each of the first and second posts 42, 44 may be formed to include a U-shaped cavity or recess 47. The recess 47 extends at least partially through the housing 46 and is sized to receive at least a portion of the first and second translating members 60, 80 when the first and second translating members 60, 80 are placed in the first or retracted position in FIG. 2. The housing 46 of each of the first and second posts 42, 44 further includes a passage 51 formed in the lower end 50 of the housing 46. As is additionally shown in FIG. 5, the passage 51 in the housing 46 of the first post 42 is configured to receive a portion of the lower end 64 of the first translating members 60. The passage 51 in the housing 46 of the first and second posts 42, 44 extends generally vertically between the upper end 48 and the lower end 50 of the first and second posts 42, 44 to receive and guide the lower portions 64, 84 of the first and second translating members 60, 80 therethrough.

It is understood that the first and second translating members 60, 80 may be configured in various geometries and include one or more members. In one non-limiting example illustrated in the Figures, the upper portion 62 of the first translating member 60 may include an upper member 66 having a first end 67 pivotally connected to the upper end 48 of the housing 46 of the first post 42 and an opposing second end 68. A central member 70 includes a first end 71 adjustably connected to the second end 68 of the upper member 66, an opposing second end 72 and a channel 73 formed in the central member 70 that extends at least partially between the first end 71 and opposing second end 72.

As is best shown in FIG. 6, the channel 73 in the central member 70 is configured to receive a portion 69 of the upper member 66 therein and allow translation of the portion 69 of the upper member 66 through the channel 73 when the first translation member 60 is adjusted between the first or retracted position and the at least one second or deployed position.

The lower portion 64 of the first translating member 60 may include a lower member 74 having a first end 75 connected to and adjustable through the passage 51 in the lower end 50 of the housing 46 and an opposing second end 76. A channel 77 is formed in the lower member 74 and extends at least partially between the first end 75 and the opposing second end 76 of the lower member 74. The channel 77 in the lower member 74 is configured to receive a portion 78 of the central member 70 therein and allow translation of the portion 78 of the central member 70 through the channel 77 when the first translating member 60 is adjusted between the first or retracted position and the at least one second or deployed position.

The second translating member 80 may include a similar configuration to the first translating member 60. For example, the upper portion 82 of the second translating member 80 may include an upper member 86 having a first end 87 pivotally connected to the upper end 48 of the housing 46 of the second post 44 and an opposing second end 88. A central member 90 includes a first end 91 adjustably connected to the second end 88 of the upper member 86, an opposing second end 92 and a channel 93 formed in the central member 90 that extends at least partially between the first end 91 and opposing second end 92. The channel 93 in the central member 90 is configured to receive a portion 89 of the upper member 86 therein and allow translation of the portion 89 of the upper member 86 through the channel 93 when the second translating member 80 is adjusted between the first or retracted position and the at least one second or deployed position.

The lower portion 94 of the second translating member 80 may include a lower portion 84 having a first end 95 connected to and adjustable through the passage 51 in the lower end 50 of the housing 46 of the second post 44 and an opposing second end 96. A channel 97 is formed in the lower member 94 and extends at least partially between the first end 95 and the opposing second end 96 of the lower member 94. The channel 97 in the lower member 94 is configured to receive a portion 98 of the central member 90 therein and allow translation of the portion 98 of the central member 90 through the channel 97 when the second translating member 80 is adjusted between the first or retracted position and the at least one second or deployed position.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A cargo management system for a cargo area at least partially defined between opposing sidewalls and a load floor of a vehicle comprising:
   at least one guide surface disposed proximate the load floor; and
   a support structure adjustably connected to the at least one guide surface, the support structure including:
      a first post,
      a second post adjustable relative to the first post, wherein each of the first and second posts includes a housing having an upper end and an opposing lower end,
      a first translating member operatively connected to and extending between the first and second posts, wherein the first translating member includes an upper portion pivotally connected to the upper end of the first post and a lower portion movably connected to the lower end of the second post, and
      a second translating member operatively connected to and extending between the first and second posts, wherein the second translating member includes an upper portion pivotally connected to the upper end of the second post and a lower portion movably connected to the lower end of the first post,
      wherein the first and second translating members are adjustable between a first position wherein the first post is proximate the second post and at least one second position wherein the first and second translating members are adjusted to position the second post relative to the first post.

2. The cargo management system of claim 1 wherein the at least one guide surface further comprises a first guide rail and an opposing second guide rail disposed in the load floor of the vehicle that is configured to receive the first and second posts of the support structure.

3. The cargo management system of claim 2 further comprising one or more projections extending from the lower end of the housing of each of the first and second posts, wherein the one or more projections of the first post are configured to releasably engage the first guide rail and the one or more projections of the second post are configured to releasably engage the second guide rail.

4. The cargo management system of claim 1 wherein the housing of each of the first and second posts further comprises a recess extending at least partially therethrough configured to receive a portion of the first and second translating members when the first and second translating members are placed in the first position.

5. The cargo management system of claim 1 wherein the housing of each of the first and second posts further comprises a passage formed in the lower end of the housing configured to receive a portion of a lower end of the first and second translating members.

6. The cargo management system of claim 5 wherein the passage of each of the first and second posts extends generally vertically between the upper end and lower end of the respective first and second posts to receive and guide the lower portions of the first and second translating members.

7. The cargo management system of claim 5 wherein the first and second translating members each further comprise:
   an upper member having a first end pivotally connected to the upper end of the respective housing and an opposing second end;
   a lower member having a first end connected to and adjustable through the passage in the respective lower end, an opposing second end and a channel formed in the lower member extending at least partially between the first end and the opposing second end; and
   a central member having a first end, a second end cooperating with the channel in the lower member and a channel formed in the central member extending at least partially between the first end and second end,
   wherein the second end of the upper member is adjusted through the channel in the central member and the second end of the central member is adjusted through the channel in lower member as the second post is moved between the first position and the at least one second position.

8. A support structure comprising:
   a first post,
   a second post adjustable relative to the first post, wherein each of the first and second posts includes a housing having an upper end and an opposing lower end,
   a first translating member operatively connected to and extending between the first and second posts, wherein the first translating member includes an upper portion pivotally connected to the upper end of the first post and a lower portion movably connected to the lower end of the second post, and
   a second translating member operatively connected to and extending between the first and second posts, wherein the second translating member includes an upper portion pivotally connected to the upper end of the second post and a lower portion movably connected to the lower end of the first post,
   wherein the first and second translating members are adjustable between a first position wherein the first post is proximate the second post and at least one second position wherein the first and second translating members are adjusted to position the second post relative to the first post.

9. The support structure of claim 8 further comprising one or more projections extending from the lower end of the housing of each of the first and second posts configured to position the first and second support posts on a surface.

10. The support structure of claim 8 wherein the housing of each of the first and second posts further comprises a recess extending at least partially therethrough configured to receive a portion of the first and second translating members when the first and second translating members are in the first position.

11. The support structure of claim 8 wherein the housing of each of the first and second posts further comprises a passage formed in the lower end of the housing configured to receive a portion of a lower end of the first and second translating members.

12. The support structure of claim 11 wherein the passage of each of the first and second posts extends generally vertically between the upper end and lower end of the respective first and second posts to receive and guide the lower portions of the first and second translating members.

13. The support structure of claim 11 wherein the first and second translating members each further comprise:
an upper member having a first end pivotally connected to the upper end of the respective housing and an opposing second end;
a lower member having a first end connected to and adjustable through the passage in the respective lower end, an opposing second end and a channel formed in the lower member extending at least partially between the first end and the opposing second end; and
a central member having a first end, a second end cooperating with the channel in the lower member and a channel formed in the central member extending at least partially between the first end and second end,
wherein the second end of the upper member is adjusted through the channel in the central member and the second end of the central member is adjusted through the channel in lower member as the second post is moved between the first position and the at least one second position.

14. A vehicle comprising:
a cargo area at least partially defined between opposing sidewalls and a load floor;
a cargo management system cooperating with the cargo area, the cargo management system including at least one guide surface disposed proximate the load floor and a support structure adjustably connected to the at least one guide surface, the support structure including:
a first post,
a second post adjustable relative to the first post, wherein each of the first and second posts include a housing having an upper end and an opposing lower end,
a first translating member operatively connected to and extending between the first and second posts, wherein the first translating member includes an upper portion pivotally connected to the upper end of the first post and a lower portion movably connected to the lower end of the second post, and
a second translating member operatively connected to and extending between the first and second posts, wherein the second translating member includes an upper portion pivotally connected to the upper end of the second post and a lower portion movably connected to the lower end of the first post,
wherein the first and second translating members are adjustable between a first position wherein the first post is proximate the second post and at least one second position wherein the first and second translating members are adjusted to position the second post relative to the first post.

15. The vehicle of claim 14 wherein the at least one guide surface further comprises a first guide rail and an opposing second guide rail disposed in the load floor of the vehicle that is configured to receive the first and second posts of the support structure.

16. The vehicle of claim 15 further comprising one or more projections extending from the lower end of the housing of each of the first and second posts, wherein the one or more projections of the first post are configured to releasably engage the first guide rails and the one or more projections of the second post are configured to releasably engage the second guide rail.

17. The vehicle of claim 14 wherein the housing of each of the first and second posts further comprises a recess extending at least partially therethrough configured to receive a portion of the first and second translating members when the first and second translating members are placed in the first position.

18. The vehicle of claim 14 wherein the housing of each of the first and second posts further comprises a passage formed in the lower end of the housing configured to receive a portion of a lower end of the first and second translating members.

19. The vehicle of claim 18 wherein the passage of each of the first and second posts extends generally vertically between the upper end and lower end of the respective first and second posts to receive and guide the lower portions of the first and second translating members.

20. The vehicle of claim 18 wherein the first and second translating members each further comprise:
an upper member having a first end pivotally connected to the upper end of the respective housing and an opposing second end;
a lower member having a first end connected to and adjustable through the passage in the respective lower end, an opposing second end and a channel formed in the lower member extending at least partially between the first end and the opposing second end; and
a central member having a first end, a second end cooperating with the channel in the lower member and a channel formed in the central member extending at least partially between the first end and second end,
wherein the second end of the upper member is adjusted through the channel in the central member and the second end of the central member is adjusted through the channel in lower member as the second post is moved between the first position and the at least one second position.

* * * * *